Patented July 17, 1923.

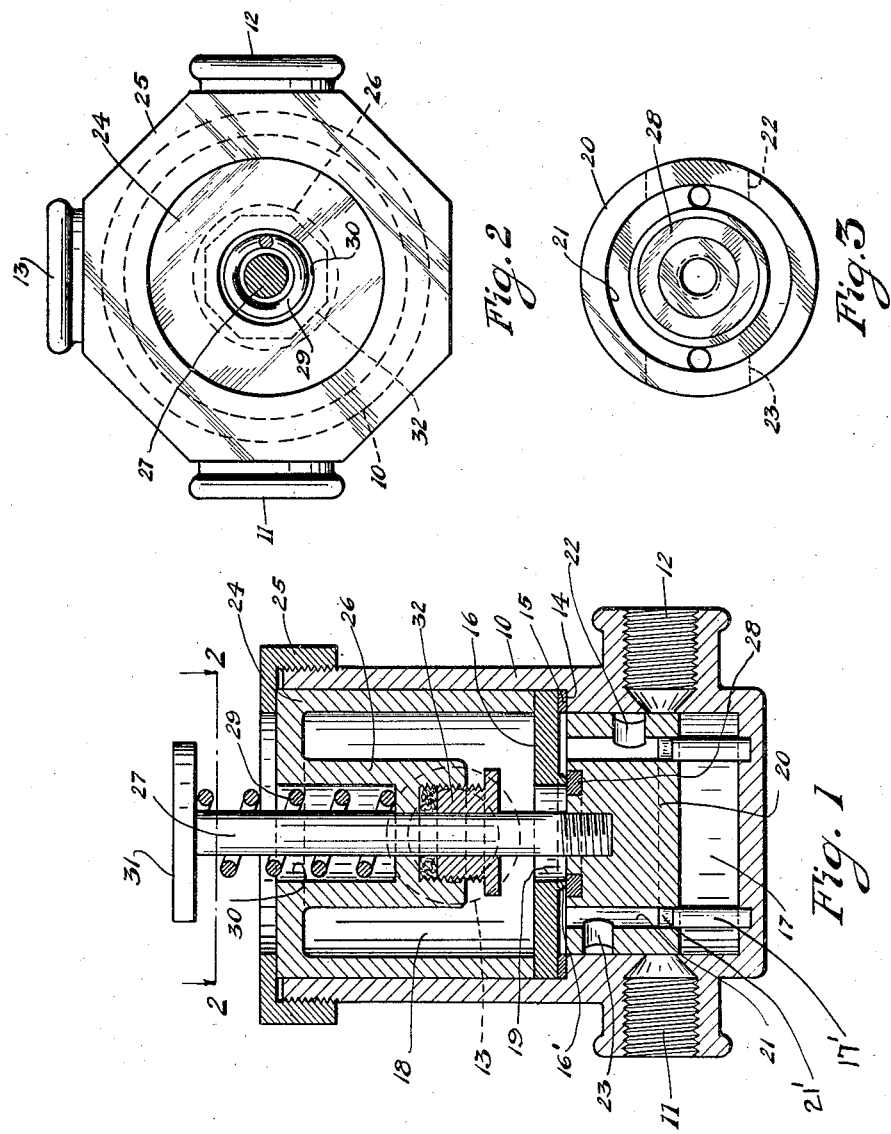

1,462,147

UNITED STATES PATENT OFFICE.

LEO F. O'FLAHERTY AND WILLIAM L. KIRKPATRICK, OF ELGIN, ILLINOIS.

VALVE.

Application filed March 31, 1922. Serial No. 548,338.

*To all whom it may concern:*

Be it known that we, LEO F. O'FLAHERTY and WILLIAM L. KIRKPATRICK, citizens of the United States, and residents of the city of Elgin, county of Kane, and State of Illinois, have invented certain new and useful Improvements in Valves, of which the following is a specification.

This invention relates to valves, and more particularly to mixing valves for hot and cold water or other fluids, and has for its object the provision of a device of this character which in addition to means for mixing fluids, is arranged to have independent means to automatically seal the mixing valve when in inoperative position to prevent leakage therefrom.

Other objects will appear hereinafter.

The invention consists in the combinations and arrangements of parts hereinafter described and claimed.

The invention will be best understood by reference to the accompanying drawings forming a part of this specification, and in which, Fig. 1 is a vertical sectional view of the invention, Fig. 2 is a view partly in section on line 2—2 of Fig. 1, and Fig. 3 is a top plan view of the mixing valve proper.

The invention consists of a suitable casing 10, preferably having inlet ducts 11 and 12 and an outlet duct 13. The casing 10 is provided substantially intermediate its ends with shoulders 14, upon which may be placed a suitable gasket 15, to form a seat for a partition 16, such partition defining a mixing chamber 17 and a discharge chamber 18, such chambers being connected by an aperture 19 in the partition 16, which aperture is preferably surrounded by a rib 16'. The above described construction is substantially similar to that shown and claimed in my companion application filed on even date herewith.

Mounted in the chamber 17 is a mixing valve 20, which is particularly described in my companion application, Ser. No. 548333, filed March 31, 1922. Such valve preferably consists of a disc provided with an annular recess 21, which communicates with the inlet ducts 11 and 12 by means of ports 22 and 23 formed in said valve, such ducts being offset with respect to each other so that during a complete operative stroke of the valve 20, the port 22 is first put into communication with the recess 21, further movement of said valve permitting communication between both of the ducts 11 and 12, still further movement of said valve closing the port 12 and opening the port 11 to its fullest extent. The valve 20 is also provided with apertures 21' communicating with the recess 21, and the bottom of the chamber 17 is provided with pins 17' adapted to project into the apertures 21' so as to prevent rotation of the valve in the chamber 17.

Mounted in the discharge chamber 18, and adapted to rest on the partition 16 is an inverted cup-shaped member 24, which member is held in position by means of a cap 25 threaded onto the casing 10 as shown. Such cup-shaped member is provided with an inwardly projecting hollow boss 26 which forms a bearing for the stem 27 which has its inner end connected by any suitable means to the valve 20.

An important feature of the invention lies in providing the valve 20 with a washer or packing ring 28, which is adapted in the innermost position of the valve 20 to abut against the rib 16', and close the aperture in the partition 16 so as to cut off the flow of water to the discharge chamber 18.

The valve 20 is normally held in inoperative position by means of a spring 29 mounted in the socket 30 in the boss 26, the outer end of the spring 29 abutting against the knob 31 on the stem 27. A gland 32 is provided in the inner end of the boss 26 and surrounds the stem 27 in order to insure a watertight connection during the sliding movements of said stem.

In operation it will be seen that by pressing the stem 27, the ports 22 and 23 are selectively engaged with the inlets 11 and 12. As soon as pressure is removed from the stem 27 the valve returns to its seat, which in addition to closing the ports 22 and 23, also closes the aperture 19 in the partition 16, and the spring 29 holds the packing ring 28 of the valve 20 tightly against the rib 16', thereby sealing the valve and effectually preventing leakage of water past the valve and through the aperture 19.

While we have illustrated and described the preferred form of construction for carrying our invention into effect, this is capable of variation and modification without departing from the spirit of the invention.

We, therefore, do not wish to be limited to the precise details of construction set forth, but desire to avail ourselves of such variations and modifications as come within the scope of the appended claims.

Having described our invention, what we claim as new and desire to secure by Letters Patent is:

1. A mixing device including a casing having mixing and discharge chambers therein; a partition between said chambers provided with a connecting aperature; an inverted cup-shaped member adapted to rest upon said partition, said cup-shaped member being provided with an inwardly turned hollow boss; means for retaining said cup-shaped member in said casing; a mixing valve in said mixing chamber; an operating stem extending through said boss and said aperture and being connected to said valve; and a spring disposed about said stem and seated in said boss.

2. A mixing device including a casing provided with mixing and discharge chambers; there being a partition between said chambers provided with a connecting aperature; a mixing valve in said mixing chamber; an inverted cup-shaped member disposed in said discharge chamber and resting upon said partition, said cup-shaped member being provided with a hollow inturned boss, the inner end of said boss being provided with a packing gland; means for holding said cup-shaped member in said casing; an operating stem extending through said boss and said packing gland and being connected to said mixing valve; and a spring disposed about said stem and seated in said hollow boss to normally retain said valve in inoperative position.

3. A mixing device including a casing having mixing and discharge chambers, there being a shoulder formed on the inner periphery of said casing between said chambers; a partition seated upon said shoulders, said partition being provided with a connecting aperture; a mixing valve in said mixing chamber; an inverted cup-shaped member adapted to rest upon said partition, said cup-shaped member being provided with an inwardly turned hollow boss; means secured to said casing for holding said cup-shaped member and said partition in position; an operating stem extending through said hollow boss and being connected with said mixing valve; and a spring disposed about said stem and seated in said hollow boss for normally holding said valve in inoperative position.

In testimony whereof, we have signed our names to this specification in the presence of two subscribing witnesses.

LEO F. O'FLAHERTY.
WILLIAM L. KIRKPATRICK.

Witnesses:
JOSHUA R. H. POTTS,
FREDA C. APPLETON.